US009527597B1

(12) United States Patent
Sada et al.

(10) Patent No.: US 9,527,597 B1
(45) Date of Patent: Dec. 27, 2016

(54) UNMANNED AERIAL VEHICLE WITH TWIN-ENGINE FORE/AFT CONFIGURATION AND ASSOCIATED SYSTEMS AND METHODS

(71) Applicants: Jaime Sada, San Antonio, TX (US); David Alejandro Arrellano Escarpita, Durango (MX)

(72) Inventors: Jaime Sada, San Antonio, TX (US); David Alejandro Arrellano Escarpita, Durango (MX)

( * ) Notice: Subject to any disclaimer, the term of this patent is extended or adjusted under 35 U.S.C. 154(b) by 0 days.

(21) Appl. No.: 14/153,721

(22) Filed: Jan. 13, 2014

Related U.S. Application Data

(60) Provisional application No. 61/751,661, filed on Jan. 11, 2013.

(51) Int. Cl.
  *B64D 27/08* (2006.01)
  *B64C 39/02* (2006.01)

(52) U.S. Cl.
  CPC ............. *B64D 27/08* (2013.01); *B64C 39/024* (2013.01); *B64C 2201/044* (2013.01)

(58) Field of Classification Search
  CPC ......... B64D 27/04; B64D 27/08; B64D 27/14; B64D 27/20; B64C 2201/04; B64C 2201/044
  See application file for complete search history.

(56) References Cited

U.S. PATENT DOCUMENTS

| | | | | |
|---|---|---|---|---|
| 1,919,682 A * | 7/1933 | Bellanca | ................ | B64D 27/08 244/135 R |
| 2,140,783 A * | 12/1938 | Bellanca | ................ | B64C 39/04 244/13 |
| 2,348,792 A * | 5/1944 | Dornier | ................ | B64D 27/08 244/57 |
| 3,134,561 A * | 5/1964 | Deodat | ................ | B64C 23/005 244/102 R |
| 5,782,427 A * | 7/1998 | Hermach | ............... | B64D 27/08 244/120 |
| 5,890,441 A * | 4/1999 | Swinson | ............. | B64C 29/0025 244/12.1 |
| 6,367,738 B1 * | 4/2002 | Wadleigh | ................ | B64C 39/04 244/13 |
| 7,549,604 B2 * | 6/2009 | Hutterer | ................ | B64D 27/02 244/54 |

(Continued)

FOREIGN PATENT DOCUMENTS

| | | | | |
|---|---|---|---|---|
| FR | | 2993859 A | 1/2014 | |
| FR | | 2993859 A1 * | 1/2014 | ............. B64C 39/12 |

(Continued)

OTHER PUBLICATIONS

Dornier Seastar. Last modified: Jun. 23, 2015. In Wikipedia. Retrieved on Jul. 17, 2015, from https://en.wikipedia.org/w/index.php?title=Dornier_Seastar&oldid=668363573, 3 pages.

(Continued)

*Primary Examiner* — Joseph W Sanderson
(74) *Attorney, Agent, or Firm* — Perkins Coie LLP

(57) ABSTRACT

An Unmanned Aerial Vehicle (UAV) for use in military and civilian functions, including a UAV being optimized by utilizing a front and a rearmost engine positioning in addition to an engine operating system for maximum fuel efficiency and performance.

20 Claims, 1 Drawing Sheet

(56) References Cited

U.S. PATENT DOCUMENTS

| | | | | |
|---|---|---|---|---|
| 8,152,096 | B2* | 4/2012 | Smith | B64C 29/0033 244/12.4 |
| 9,085,355 | B2* | 7/2015 | DeLorean | B64C 29/0033 |
| 2006/0151666 | A1 | 7/2006 | Vandermey et al. | |
| 2007/0187547 | A1 | 8/2007 | Kelly | |
| 2008/0099599 | A1* | 5/2008 | Hutterer | B64D 27/02 244/15 |
| 2008/0184906 | A1 | 8/2008 | Kejha et al. | |
| 2011/0056183 | A1 | 3/2011 | Sankrithi et al. | |
| 2012/0025012 | A1 | 2/2012 | Arlton | |
| 2013/0020429 | A1 | 1/2013 | Kroo | |
| 2014/0061391 | A1* | 3/2014 | Ffield | F02B 25/14 244/53 R |

FOREIGN PATENT DOCUMENTS

| | | |
|---|---|---|
| KR | 10-2003-0049796 A | 6/2003 |
| WO | 2010020199 A1 | 2/2010 |
| WO | 2015138217 A1 | 9/2015 |

OTHER PUBLICATIONS

Cessna Skymaster. Last modified: Jul. 7, 2015. In Wikipedia. Retrieved on Jul. 17, 2015, from https://en.wikipedia.org/w/index/php?title=Cessna_Skymaster&oldid=670410418, 6 pages.

Star Kraft, Aircraft Designs. Retrieved on Jun. 2, 2014, from http://www.aircraftdesigns.com/starkraft.html, 2 pages.

Moynet Jupiter. Last modified: Jun. 12, 2013. In Wikipedia. Retrieved Jun. 2, 2014 from http://en.wikipedia.org/wiki/Moynet_Jupiter, 4 pages.

Arcturus UAV, Jump Fixed Wing VTOL UAV. Retrieved on Jun. 2, 2014, from http://www.arcturus-uav.com/aircraft_jump.html, 1 page.

Latitude Engineering, Hybrid Quadrotor, "Latitude has developed a new concept for long endurance Vertical Takeoff and Landing . . . ". Retrieved on Jun. 2, 2014, from https://latitudeengineering.com/products/hq/, 7 pages.

Aero Design DG-1. Last modified Jun. 23, 2015. In Wikipedia. Retrieved on Oct. 9, 2015, from https://en.wikipedia.org/wiki/Aero_Design_DG-1, 2 pages.

Aeronix Airelle. Last modified Jun. 23, 2015. In Wikipedia. Retrieved on Oct. 9, 2015, from https://en.wikipedia.org/wiki/Aeronix_Airelle, 3 pages.

Dornier Do 335. Last modified Sep. 13, 2015. In Wikipedia. Retrieved on Oct. 9, 2015, from https://en.wikipedia.org/wiki/Dornier_Do_335, 7 pages.

Flylab Tucano. Last modified Jun. 23, 2015. In Wikipedia. Retrieved from https://en.wikipedia.org/wiki/Flylab_Tucano, 3 pages.

IAI RQ-5 Hunter. Last modified Jun. 24, 2015. In Wikipedia. Retrieved on Oct. 9, 2015, from https://en.wikipedia.org/wiki/IAI_RQ-5_Hunter, 2 pages.

Rutan Defiant. Last modified Jul. 20, 2015. In Wikipedia. Retrieved on Oct. 9, 2015, from https://en.wikipedia.org/wiki/Rutan_Defiant, 3 pages.

TAI Baykus. Last modified Oct. 7, 2013. In Wikipedia. Retrieved on Oct. 9, 2015, from https://en.wikipedia.org/wiki/TAI_Bayku%C5%9F, 2 pages.

TAI Pelikan. Last modified Oct. 7, 2013. In Wikipedia. Retrieved on Oct. 9, 2015, from https://en.wikipedia.org/wiki/TAI_Pelikan, 2 pages.

* cited by examiner

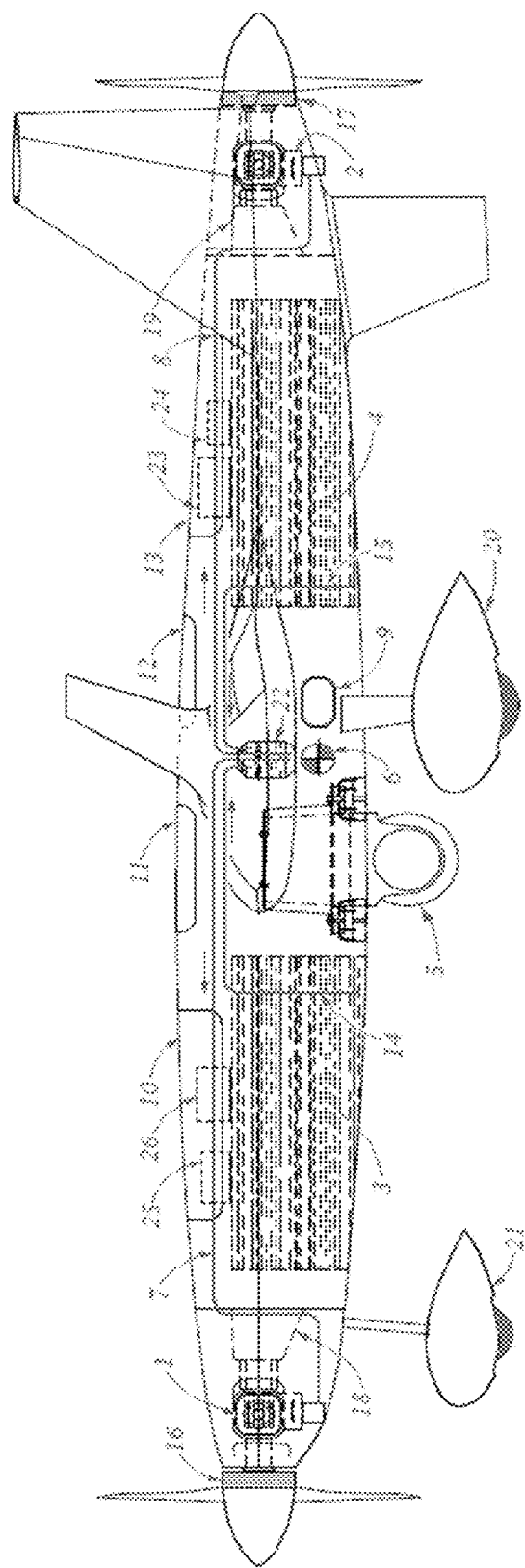

UNMANNED AERIAL VEHICLE WITH TWIN-ENGINE FORE/AFT CONFIGURATION AND ASSOCIATED SYSTEMS AND METHODS

CROSS REFERENCE TO RELATED APPLICATIONS

The present application claims priority to the U. S. Provisional Application for Patent having the Application Ser. No. 61/751,661, filed Jan. 11, 2013, and entitled "Unmanned Aerial Vehicle." The above-referenced application is incorporated by reference herein in its entirety.

TECHNICAL FIELD

This disclosure relates in general to the field of aviation, more specifically an Unmanned Aircraft Vehicle (UAV) design focusing on a weight-balanced front and rearmost engine positioning and an efficient power band engine operation of two separate, center line thrust positioned engines.

BACKGROUND

An aircraft without a human pilot on board is known as an Unmanned Aerial Vehicle (UAV), otherwise referred to as a drone. UAVs can be controlled either by an electronic computer located within the aircraft itself or remotely by a navigator or pilot located on the ground or elsewhere, separate from the UAV. UAVs are used for a variety of different purposes including, but not limited to, military operations and surveillance.

Traditional aviation design focuses on many aspects that create a balance of efficiency and performance. The first aspect that is taken into consideration is the center of gravity (CG). The CG is the point at which weight force, or the entire weight of the aircraft, is considered to be concentrated. The CG affects the stability of the entire aircraft and must be kept within certain bounds in order to maintain safety.

To counterbalance the weight force, aircraft generate an opposing force, a lift force, which is generated by the motion of the aircraft as it travels through the air. Another consideration taken into account with aircraft design is the center of lift (CL). The CL is the point at which the lift force is considered to be concentrated.

In most existing aircraft, cargo cannot be placed too far forward or backward in the plane, relative to the CG, because it can create instability. Cargo being transported in the aircraft must be placed within a location very close to the CG, referred to as the CG envelope, usually located around the center portion of the aircraft. The CG envelope can be designated by the manufacturer and takes into account the equipment and contents of the aircraft. This can limit space for transportation to a very small area within the craft.

SUMMARY

The present disclosure relates to an Unmanned Aerial Vehicle (UAV) that incorporates a front and a rearmost engine, along with an engine operating system, for optimal space and energy efficiency.

UAVs can be used for a variety of functions including, but not limited to: load droppings, military operations, intelligence gathering, surveillance, and data collection. UAVs can be equipped with sensors of a large variety that will allow for a range of functions to be performed by the aircraft.

Limitations often exist with UAVs due to space and fuel consumption concerns. There exists a limited range where the CG of a UAV can be located and still maintain a safe and controlled flight. Additionally, onboard supplies and cargo can only be placed near the CG in order to maintain stability, which often results in a waste of available space and associated efficiency concerns.

By utilizing foremost and a rearmost engine arrangement, the aircraft is able to maintain balance and stability during flight while allowing the front and rear spaces of the aircraft to be occupied by onboard equipment, supplies, or cargo needing to be transported or utilized depending on the intended purpose of the flight. While the spaces at the front and tail-end of the aircraft would normally remain empty due to stability concerns, the disclosed engine arrangement allows for maximum space efficiency.

It is difficult to achieve optimal fuel efficiency with a single engine. By utilizing two engines for space and balance concerns, fuel efficiency is also able to be maximized through a control system. The system utilizes an approach in which one engine is shut off once the cruise altitude is reached. Depending on the characteristics of the two engines being used, and the optimization point or speed desired, the engine with the best fuel efficiency for a specialized purpose will be solely operating.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGURE and detailed description. It is intended that all such additional systems, methods, features and advantages that are included within this description, be within the scope of any claims filed later.

BRIEF DESCRIPTION OF THE FIGURE

The features believed characteristic of the invention will be set forth in the claims. The invention itself, however, as well as a preferred mode of use, further objectives, and advantages thereof, will best be understood by reference to the following detailed description of an illustrative embodiment when read in conjunction with the accompanying drawings, wherein:

FIG. 1 shows an embodiment of the disclosed UAV.

DETAILED DESCRIPTION

The present disclosure relates to an Unmanned Aerial Vehicle (UAV) employing a fore and rearmost engine positioning as well as an engine operating system in the design.

The disclosed UAV has two engines (e.g., a twin-engine configuration), with the first engine installed in the front most extreme of the fuselage 1 and the second engine installed at the rear most extreme of the fuselage 2. In some embodiments, both engines are installed in the center of the longitudinal axis, with each engine having its own support, independent front engine control 18, and rear engine control 19. Each engine may have its own electric generator 16, 17 to achieve redundancy both in terms of propulsion and electric generation in order to safely operate the aircraft and its flight control systems, communications, and sensors.

The disclosed UAV creates flight stability by balancing a front engine with a rearmost engine to allow the aircraft to utilize a two-engine design for balance with the center of gravity envelope. This embodiment generates symmetry in the weight distribution, with respect to the center of gravity (CG) 6 of the UAV, allowing for the fullest possible utilization of internal volume for the transport of fuel, equipment, payload, etc.

In order to maintain pitch stability, a CG 6 must be maintained within certain limits in all types of aircraft. In some embodiments, in order to maintain said CG, the variable useful load due to fuel is distributed with 2 or more tanks equally distanced from the CG 6, one located in the front 3 of the UAV and one located in the rear 4. As a result, enough space is maintained very near and around the CG 6 position to carry highly variable different payloads and equipment without exceeding weight and balance limitations. Additionally, the available cargo space situated in near proximity to the CG position is ideal for the placement of an automatic pilot 9.

In some embodiments, it is possible to distribute the necessary equipment along the fuselage by utilizing the available space on top of the fuel tanks. Such equipment can include, but not be limited to, batteries 23, a transponder 24, satellite communications equipment 25 or radio communications equipment 26.

In some embodiments, in order to install and service the equipment and payload, several access doors may be employed on the top side of the fuselage. The access doors may be located in the front 10, in the center front 11, in the center rear 12, and in the rear 13 of the UAV. The number and position of said access doors may vary according to a multitude of factors such as the size and shape of the UAV.

The power requirements for UAVs may vary greatly according to the flight phase. Full power is needed for takeoff, high power is needed for climb, and very low power is needed for cruise flight (loiter mode). Internal combustion engines attain their most efficient fuel consumption, otherwise known as the Specific Fuel Consumption (SFC) or Brake Specific Fuel Consumption (BSFC), within a very specific power band. The SFC can be very high under a high power demand or under a low power demand. In some embodiments, one of the engines may be shut off at the loiter phase without producing any thrust asymmetries, while at the same time obtaining the best SFC possible.

In some embodiments, two engines of different types and power characteristics can be used for increased efficiency of the UAV for each mission requirement. For example, in order to maximize endurance, a low power 4 cycle engine can be utilized in the front 1 of the UAV while a high power 2 cycle engine can be utilized at the rear 2 of the UAV. A low power 4 cycle engine with a very favorable SFC may be employed to operate the UAV under loiter conditions. Although the higher power 2 cycle engine has a much higher SFC than a low power 4 cycle engine, it is very light in weight and may be operated for just a few minutes (under the takeoff and climb phases) so the fuel penalty may be negligible.

In other embodiments, in order to preserve the power redundancy with one engine shut off, it is possible to install in-flight engine starters. Flight engine starters may be incorporated into the generators 16, 17 or separately in such a way that, if the operating engine fails, the engine that had previously been shut off will immediately start.

In some embodiments, two engines of different powers and weights may be utilized, which may require a balance. Even though two different types of engines may be used having different power outputs, balance can maintained due to the similarity in weight of a high power 2 cycle engine and a lower power 4 cycle engine. Any small weight differences that remain may be balanced with strategic placement along the fuselage of equipment and sensors.

In order to maintain a CG within the required limits, in some embodiments it may be necessary to keep the fuel levels of the engine(s) employed at an almost equal level in order to maintain balance. In other embodiments, a fuel management system may be required in which the fuel from each tank is routed through fuel lines 14, 15 to a central distribution fuel tank 22. The central distribution fuel tank may send the fuel to a front engine via its fuel line 7 and to a rear engine via a separate fuel line 8. Any imperfections in fuel levels may be corrected by alternating which fuel tank is selected for use using valve selector mechanisms or by a fuel transfer pump system between the main tanks. A weight balancing fine tuning mechanism allows for the reduction of the horizontal stabilizer down force to its minimum value, reducing the unwanted trim drag produced.

In some embodiments, the main landing gear 20 and the directional control landing gear 21 may be located in the front of the UAV and may or may not be retractable, depending on the priorities of the particular purpose being performed by the UAV. In other embodiments, the main landing gear 20 and the directional control landing gear 21 may also be eliminated if another system is preferred such as a dolly or catapult takeoff system. The UAV may then be landed with the assistance of a parachute, captured in a net or line, or landed on its belly.

While the invention has been described with respect to a limited number of embodiments, the specific features of one embodiment should not necessarily be attributed to other embodiments of the invention; however, in some embodiments features could be removed and/or combined with one or more features of the other embodiments to create additional embodiments. No single embodiment is representative of all aspects of the inventions. Moreover, variations and modifications therefrom exist. For example, the invention described herein may comprise other algorithms or pieces. Various steps may also be added to further enhance one or more properties of said pieces. In addition, some embodiments of the methods described herein consist of or consist essentially of the enumerated steps. The claims to be appended later are intended to cover all such variations and modifications as falling within the scope of the invention.

What is claimed is:

1. An unmanned aerial vehicle (UAV) comprising:
    a fuselage having a longitudinal axis;
    a payload bay in the fuselage;
    a first engine positioned along the longitudinal axis forward of the payload bay and coupled to a first propeller to drive the first propeller; and
    a second engine positioned along the longitudinal axis aft of the payload bay and the first engine, the second engine being coupled to a second propeller to drive the second propeller, wherein the first and second engines are of different types, and wherein one of the engines is a four-cycle engine and the other engine is a two-cycle engine.

2. The UAV of claim 1 wherein the first and second engines have different specific fuel consumption ratings.

3. The UAV of claim 1 wherein one of the engines is lighter than the other.

4. The UAV of claim 1 wherein the first and second engines form a twin-engine configuration.

5. The UAV of claim 1 wherein a center of gravity of the UAV is located within the payload bay.

6. The UAV of claim 1, further comprising a control system configured to shut down one of the first and second engines at cruise altitude.

7. The UAV of claim 6 wherein the other of the first and second engines has a better fuel efficiency than the shut down engine.

8. The UAV of claim 1 wherein the first engine is located at the front-most extreme of the fuselage.

9. The UAV of claim 1 wherein the second engine is located at the rear-most extreme of the fuselage.

10. The UAV of claim 1 wherein the first engine includes a first electrical generator and the second engine includes a second electrical generator.

11. The UAV of claim 1 wherein:
the first and second engines form a twin-engine configuration; and
one of the first engine and the second engine is located at the front-most extreme of the fuselage, and the other is located at the rear-most extreme of the fuselage.

12. An unmanned aerial vehicle (UAV) comprising:
a fuselage having a longitudinal axis;
a payload bay within the fuselage;
a first engine positioned along the longitudinal axis forward of the payload bay;
a second engine positioned along the longitudinal axis aft of the payload bay and the first engine;
a first fuel tank positioned between the first engine and the payload bay;
a second fuel tank positioned between the second engine and the payload bay;
a control system coupled to the first and second engines and configured to shut down one of the first and second engines at cruise altitude; and wherein:
a center of gravity of the UAV is located within the payload bay;
one of the first engine and the second engine has a two-cycle configuration, a first power capability and a first specific fuel consumption; and
the other of the first engine and the second engine has a four-cycle configuration, a second power capability less than the first power capability, and a second specific fuel consumption lower than the first.

13. The UAV of claim 12 wherein the engine with the two-cycle configuration is lighter than the engine with the four-cycle configuration.

14. A method for operating a unmanned aerial vehicle (UAV), comprising:
directing the UAV to take off under the power of a first engine and a second engine, the UAV including a fuselage having a longitudinal axis, the first and second engines being located along the longitudinal axis, wherein one of the engines is a four-cycle engine and the other engine is a two-cycle engine;
after takeoff, shutting down one of the first and second engines; and
cruising or loitering under the power of the other of the first and second engines.

15. The method of claim 14 wherein shutting down one of the first and second engines includes shutting down the two-cycle engine.

16. The method of claim 14 wherein cruising or loitering includes cruising or loitering under the power of the four-cycle engine.

17. The method of claim 14 wherein the UAV includes a first and second fuel tanks positioned between the first and second engines along the longitudinal axis, and wherein the method further comprises shifting fuel from the first fuel tank to the second fuel tank to control a center of gravity of the UAV.

18. The method of claim 14, further comprising loading a payload bay of the UAV, and wherein a center of gravity of the UAV is located with the payload bay.

19. An unmanned aerial vehicle (UAV) comprising:
a fuselage having a longitudinal axis;
a payload bay in the fuselage;
a first engine positioned along the longitudinal axis forward of the payload bay; and
a second engine positioned along the longitudinal axis aft of the payload bay and the first engine, wherein one of the engines is a four-cycle engine and the other engine is a two-cycle engine.

20. An unmanned aerial vehicle (UAV) comprising:
a fuselage having a longitudinal axis;
a payload bay in the fuselage;
a first engine positioned along the longitudinal axis forward of the payload bay; and
a second engine positioned along the longitudinal axis aft of the payload bay and the first engine, wherein:
the first and second engines form a twin-engine configuration;
one of the first engine and the second engine is located at the front-most extreme of the fuselage, and the other is located at the rear-most extreme of the fuselage;
one of the first engine and the second engine is a two-cycle engine with a first specific fuel consumption; and
the other of the first engine and the second engine is a four-cycle engine with a second specific fuel consumption lower than the first.

* * * * *